United States Patent [19]

Taupin et al.

[11] Patent Number: 4,571,577
[45] Date of Patent: Feb. 18, 1986

[54] METHOD AND APPARATUS FOR DETERMINING THE COORDINATES OF A POINT ON A SURFACE

[75] Inventors: Pierre Taupin, Maubeuge; Claude Goguillon, Boussois sur Sambre; Frédéric de Moncuit, Paris, all of France

[73] Assignee: Boussois S.A., Levallois Perret, France

[21] Appl. No.: 460,902

[22] Filed: Jan. 25, 1983

[30] Foreign Application Priority Data

Jan. 27, 1982 [FR] France ................. 82 01234

[51] Int. Cl.⁴ ............................................. G08C 21/00
[52] U.S. Cl. ................................. 340/347 R; 178/18
[58] Field of Search .............. 178/18, 19, 20; 33/1 M; 340/347 AD, 347 P

[56] References Cited

U.S. PATENT DOCUMENTS

| | | |
|---|---|---|
| 2,551,942 | 5/1951 | Greene . |
| 3,134,099 | 5/1964 | Woo ........................... 340/347 AD |
| 3,234,459 | 2/1966 | Brazee . |
| 3,248,646 | 4/1966 | Brazee . |
| 3,361,454 | 1/1968 | Graham et al. . |
| 3,365,661 | 1/1968 | Zimmerman . |
| 3,399,401 | 8/1968 | Ellis et al. . |
| 3,522,664 | 8/1970 | Lambright et al. . |
| 3,653,031 | 3/1972 | Hlady et al. . |
| 3,671,716 | 6/1972 | Slutsky . |
| 3,673,327 | 6/1972 | Johnson et al. . |
| 3,696,409 | 10/1972 | Braaten . |
| 3,732,557 | 5/1973 | Evans et al. . |
| 3,760,360 | 9/1973 | Reynolds et al. . |
| 3,806,912 | 4/1974 | Eckert ................................. 178/18 |
| 4,124,838 | 11/1978 | Kiss . |

FOREIGN PATENT DOCUMENTS 1541566  7/1979  United Kingdom .

Primary Examiner—Charles D. Miller
Attorney, Agent, or Firm—Young & Thompson

[57] ABSTRACT

A screen is disclosed on the surface of which a certain number of resistant conducting emitter strips and insulated conducting receiver strips are laid, the emitter strips being parallel-mounted with the terminals of a voltage generator and the receiver strips being interlaid between the receiver strips such that a conducting receiver strip lies between two resistant emitter strips. The electronics of control comprises an exploring stage to control the receiver strip time-related exploration. Thus, when a sufficiently conducting object used to indicate a point, has touched the surface and bridges an emitter strip and a receiver strip, a higher potential is detected on the corresponding receiver strip and the ordinate Y is given by the strip order number—while the abscissa X is calculated from measuring the potential between each ends of the emitter strip and the object.

8 Claims, 6 Drawing Figures

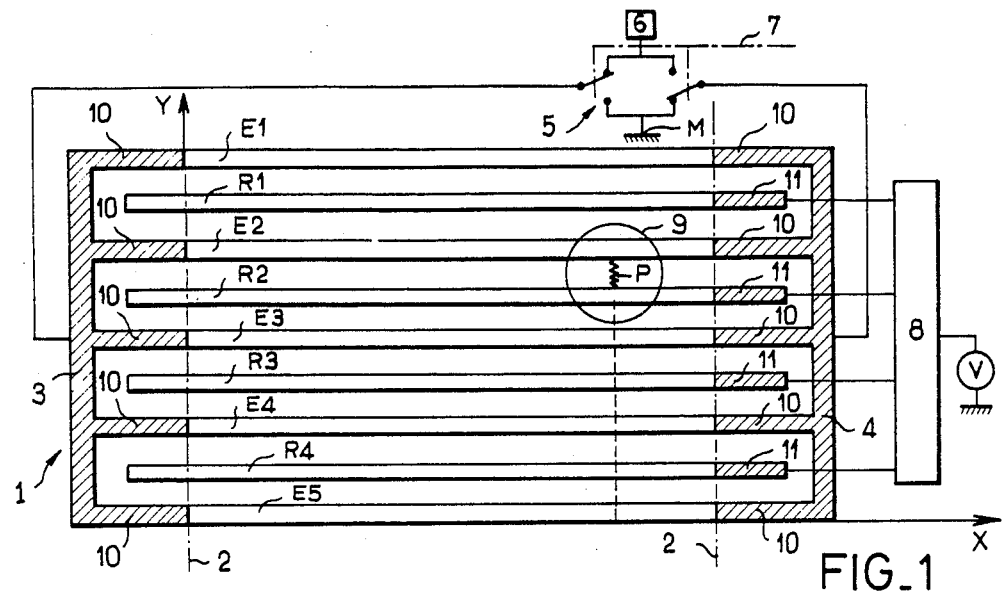
FIG_1
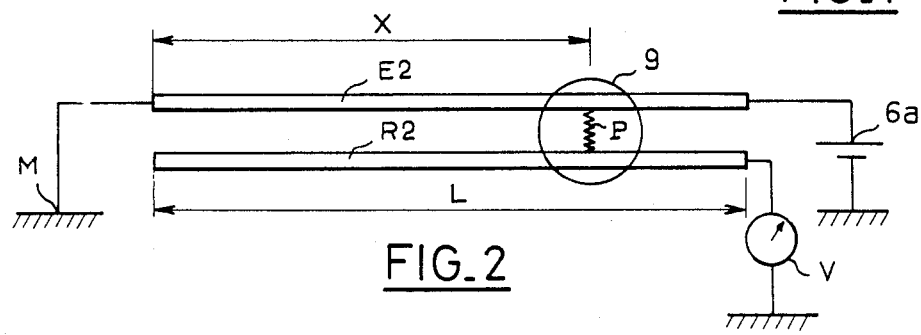
FIG_2
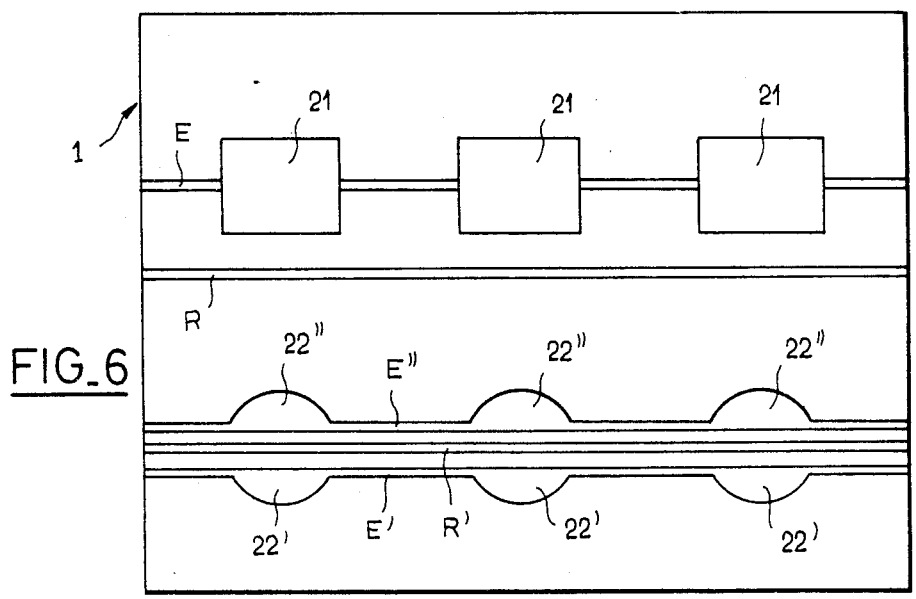
FIG_6

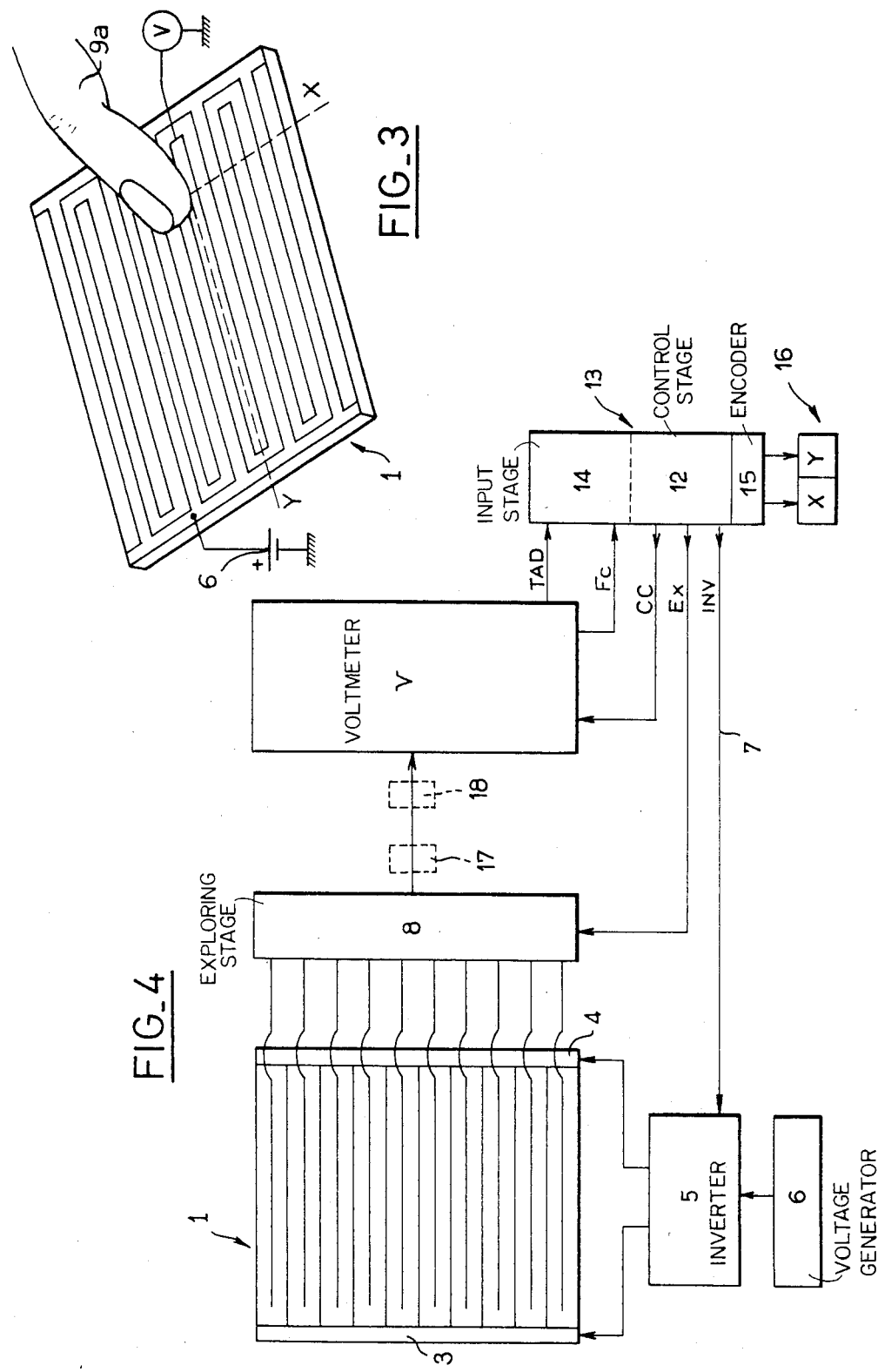

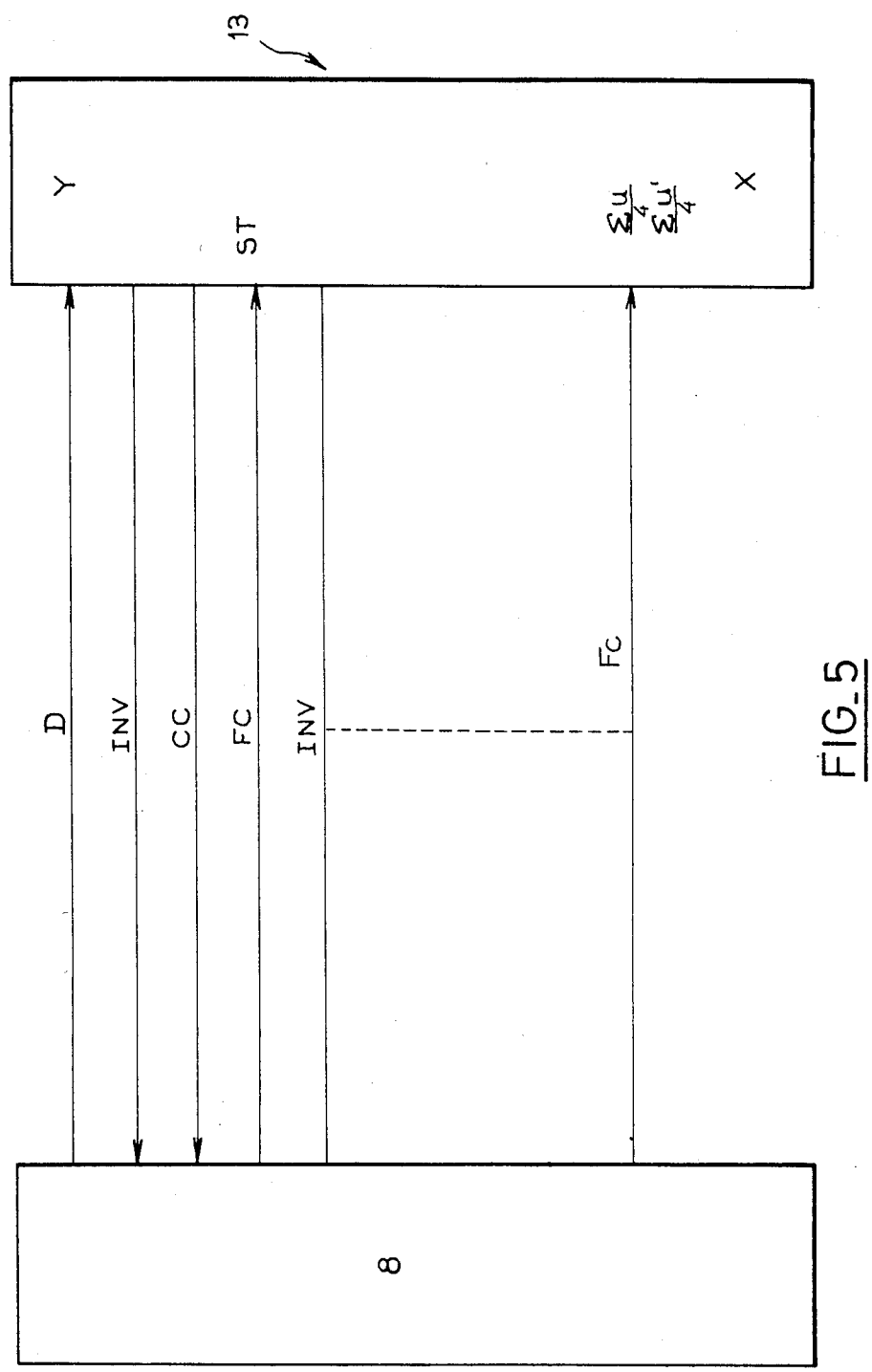
FIG_5

METHOD AND APPARATUS FOR DETERMINING THE COORDINATES OF A POINT ON A SURFACE

The present invention relates to a method for determining the corrdinates of a point on surface by pinpointing it through contact of an object with that surface.

The invention further relates to a device permitting, in particular, implementation of this method.

The known methods of this type generally rely on dividing the surface beforehand into a certain number of zones materialized as otherwise and selectively sensitive to contact with the object.

U.S. Pat. No. 3,806,912 presents thus a graphical display board equipped with a printed circuit consisting of evenly spaced parallel paths, one resistive path lying between two conductive paths. To determine the coordinates X, Y of a point, use is made of a stylus comprising one end consisting of a conducting material which must establish a negligible resistance bridge between three consecutive paths: one resistive path and two conductive paths. In this device, the resistive paths are all interconnected down to ground via a conductive cross path, whereas one path in each conducting pair is interconnected down to ground via one of its ends by means of a series resistance cross path, the other conductive paths being connected directly by one end thereof to a detection apparatus. This device has the drawback of requiring the lay-up of horizontal and vertical conductive and resistive paths on the board with overlaps for making certain connections. Moreover, coordinate determination of a point is carried out by electrically connecting three consecutive paths using a metal stylus having a small resistance and specially designed for this application.

Certain methods, which tend in fact to form control key boards utilize capacitive keys laid out in a chequered fashion over the surface. Each key constitutes a capacitor, whose dielectric varies upon touching the object, which can for example be an operator's finger. The associated electronics are relatively straight forward, by the location accuracy is rather low since the keys are fixedly positioned with a relatively large pitch.

Better accuracy is achieved with those methods employing an electrically active object, known as "light pen", which cooperates with a surface in the form of a cathode ray tube. The location of the contact point results from interaction of the object with the electronic scan of the screen. The equipment that these methods imply involves extensive and complex electronics stages, that are essentially computer-associated.

The main object of this invention is to provide a method and a device for coordinate determination which conciliates good location accuracy and a straightforward electronics infrastructure.

This problem is resolved, in accordance with the invention by performing the following operations:

(a) a certain number of resistant conducting emitter strips are laid on the surface parallel-mounted with the terminals of a voltage generator, as are a certain number of insulated conducting receiver strips interlaid between the foregoing such that a conducting receiver strip lies between two resistant emitter strips;

(b) the surface is touched with a sufficiently conducting object having dimensions such that it establishes an electrical bridge between a resistant conducting emitter strip and a conducting receiver strip;

(c) the insulated strips in which there has been a variation in potential is determined whence one of the contact point coordinates is deduced;

(d) this variation in potential is measured in order to deduce the other contact point coordinate.

The object is not electrically active. It merely needs to be sufficiently conductive to make a connection between two neighbouring strips, one emitter and one receiver. This object may then be an operator's finger. This technique therefore does away with any electronic infrastructure associated with the object.

Furthermore, this obviates any division of the surface into a criss-cross of keys set-out in a fixed pattern thus making it possible to obtain excellent point position definition by varying the width and the pitch of the strips, on a basis compatible with the object-surface contact area dimensions.

In a preferred embodiment of the method, the potential of the receiver strips can be cyclically explored until a potential in one of these strips different from that in the other strips is detected, whereupon the exploration is halted in order to measure this potential.

By way of this configuration, just one measurement apparatus proves necessary.

In a first embodiment variant of the method, a known potential is fed into one end of each emitter strip, the other end of each strip being connected to ground.

Once the potential has been measured, the emitter strip polarity is reversed in order to take a further measurement, and this cycle is repeated a certain number of times.

These operations make it possible to eliminate certain unknown constant factors, such as the object's resistance, or certain possibly variable factors, such as the supply voltage.

In a second embodiment variant of the method, an alternating potential with a frequency of approximately 1 kHz is fed into one end of each emitter strip with the other end of each strip connected down to ground and the measured voltage is filtered.

This therefore eliminates any parasite voltages induced by the surroundings, notably at the mains frequency of 50 or 60 Khz.

As before, the potential is successively measured a certain number of times, the alternating potential and ground reversed and then the same number of measurements taken again.

In every event, an average value is calculated over the potentials measured during the successive readings to minimize any possible fortuitous errors.

Lastly, the exploration is resumed once all the emitter strips have reverted to the same potential.

In a further aspect of the invention, the device for determining the coordinates of a point on a surface comprising a certain number of conductive strips ($E_1$ to $E_5$, $R_1$ to $R_4$) to form separate zones selectively sensitive to the contact of an object is characterized in that it comprises, on the surface, a certain number of resistant conducting emitter strips each having one end terminal for the ground connection and one end terminal for the voltage generator connection, and a certain number of conducting receiver strips interlaid between the emitter strips such that a conducting receiver strip lies between two resistant emitter strips where each of these conducting receiver strips has an end terminal for a connection in parallel with a potential measuring apparatus and offers a virtually constant linear resistance over its whole length.

Other peculiarities and advantages of the invention will be apparent from the following more particular description, as illustrated in the accompanying drawings, given as non exhaustive examples in which:

FIG. 1 gives a semi-schematic front view of the strip configuration on the surface, as in this invention;

FIG. 2 gives a partial view of FIG. 1 explaining how the potential is electrically measured;

FIG. 3 gives a view in perspective illustrating how the device is used, as in this invention;

FIG. 4 schematizes the overall device;

FIG. 5 gives a temporal function flowchart of the measurement processing system; and FIG. 6 depicts embodiment variations of the conducting strips.

With reference to FIG. 1, the device comprises a transparent surface 1, made of sodio-calcic glass for instance, which forms a cathode display screen. Arranged on this surface are a certain number of parallel emitter strips $E_1$ to $E_5$, e.g. in thin oxide $SnO_2$ doped with fluorine deposited by pyrolysis. These strips are conductive and have a thickness such that the resistance of strip section equal in lenght to its width is in the order of 100 to 200Ω.

The strip ends 10 are neutralized by an edging 2 of the surface and serve as electrical connections with the collecting strips 3, 4. These strips can be made up of a metal deposit that is conductive and/or can be soldered in silver or nickel deposited for example in the form of a conductive paint, resin or enamel by serigraphy.

Receiver strips $R_1$ to $R_4$ are interlaid between the emitter strips $E_1$ to $E_5$ end are formed in appreciably the same fashion and each comprise one neutralized end constituting the connection terminal 11.

To clarily matters, the strip neutralized parts and the collecting strips have been shaded in.

In the example described, each strip is 3.5 mm wide and the distance from one strip to the next is also 3.5 mm. The presence of these strips has practically no effect on the visibility through the transparent surface 1.

The collecting strips 3, 4 are wired to a switch 5 which either connects the strip 3 to a voltage generator 6 and the strip 4 to ground M (FIG. 1), or, inversely, connects the strip 3 to ground and the strip 4 to the generator 6. This switch is activated by a control mechanism 7 which will be covered in more detail later.

The receiver strips $R_1$ to $R_4$ are wired to an exploring stage 8 which successively connects those strips to a voltmeter V.

Utilization of the apparatus whose principle has just been described consists of determining the coordinates X and Y of a point on the surface that is materialized by the contact of a conducting object 9 (FIG. 1) such as an operator's finger 9a (FIG. 3). The object's dimensions must be such that it covers two adjacent strips e.g. $E_2$ and $R_2$ (FIG. 1), setting up an electrical bridge P between said two strips.

In the example shown in FIG. 1, the receiver strip $R_2$, by contact with the object, is set at a certain potential detected by the voltmeter V, and it is supposed that the ordinate Y is given by the strip order number.

The abscissa X is calculated from the sketch in FIG. 2, on which it has been assumed that the voltage generator is a generator 6a delivering a steady voltage U, of around 15 volts.

If L is the useful length of a receiver strip, then as a result of the high internal resistance in the voltmeter V:

$$X = \frac{u}{U} L.$$

where u is the voltage measured by the voltmeter

If the operation is repeated by inverting the generator 6a and the ground M, then a new voltage u' is measured, giving thus:

$$L - X = \frac{u'}{U} L$$

whence:

$$X = \frac{u \cdot L}{u + u'}$$

It will be observed that this method renders the measurement independent of the supply voltage U accidental variations in which might adversely affect the measurement, and independent of the resistance value of the contact bridge established by the conducting object 9 providing this resistance is decidedly lower than the voltmeter internal resistance to avoid disturbing the measurement. In one embodiment example, a voltmeter with an internal resistance of 2 MΩ has been chosen in the knowledge of the fact the resistance of the operator's finger measured at an applied voltage of frequency 1 kHz is around 500 kΩ. It can thus be seen that conducting object 9 over a very wide resistance range may be used, from very low values upto values in the order of 1 MΩ providing a voltmeter with a suitable internal impedance is chosen, i.e. with a much higher impedance.

A description will now be given, with reference to FIG. 4, of the electronics surrounding the device and the method description completed.

In this drawing, the strips have been shown in greater numbers than in FIG. 1, but this number is essentially variable in terms of the surface dimensions. Those elements already described have been reshown with the same reference numbers. These elements are for the most part the supply inverting switch 5, the generator 6, the exploring stage 8 and the voltmeter V which is of the digital type.

A control stage 12 of a calculating unit 13 is wired to the exploring stage 8 to control the receiver strip time-related exploration. In the example described, the timing gives a 5 ms pause before going onto the next strip.

The voltmeter V is wired to an input stage 14 on the unit 13 for transmitting a message TAD to said stage where said message comprises the digital value of the measured voltage and the address of the receiver strip where this measurement was taken.

A further connection permits transmission of a signal FC representing the end of analog-to-digital conversion.

The control stage 12 is also wired to the voltmeter V for sending it a conversion control signal CC.

Lastly, the exploring stage 8 is controlled by the stage 12 which sends it an exploration timing signal EX, and the switch 5 is, via the line 7, controlled by the same stage 12 which sends it a signal INV.

The calculating unit 13 further comprises an encoding stage 15 wired to a display unit 16 indicating the measured coordinates X and Y.

A description will now be given, notably in reference to FIG. 5, of how the overall device works and of the measurement method. On the diagram in FIG. 5, the measurement sequence runs from the top to the bottom.

Initially, the exploring stage 8 successively sweeps the receiver strips at a rate of 5 ms per strip and in the absence of the object 9, measures a zero potential each time or, to be more exact, a potential below a predetermined threshold S.

Once the object has touched the surface 1, a potential higher than the threshold S is detected, causing thus the emission of a signal D toward the calculating unit 13. The receiver strip where the detection occurred is stored as a number to give the ordinate Y. The control stage 12 then sends the order INV to invert the polarity across the emitter strips, followed by a voltage measurement and digital conversion order CC. When the conversion has been completed, the stage 8 emits an order FC which causes storage ST of the converted measurement u.

By means of a new order INV, the polarity on the emitter strips is reversed and a new measurement u' is taken and stored.

This process is repeated five times. The first measurement against each polarity is then eliminated, to avoid any transient phenomena. Lastly, the averages of the u and u' measurements are calculated to deduce the abscissa X by means of the formula given earlier.

The results are finally indicated on the display device 16.

The calculation process is halted and the stage 8 resumes sweeping only once the detected receiver strip potential has dropped back below the threshold S, namely when the object 9 is no longer in contact with the surface.

All the foregoing applies to the case of the generator 6 delivering a steady voltage.

As a variant, an alternating voltage generator may be used with a frequency of 1 kHz. Under these circumtances, an active band-pass filter 17 corresponding to the 1 kHz band is positioned between the exploring stage 8 and the voltmeter V followed by an active rectifier 18 which delivers a steady voltage to the voltmeter input.

The measuring method is virtually the same, save that five successive measurements are taken with the generator on one side and the ground on the other, and then five more after having inverted the generator and the ground.

The advantage of using alternating current is that, as a result of the filtering, the 50 or 60 Hz components induced by the surroudings are eliminated, as are any possible interference effects brought about by thyristors in the vicinity.

In all events, the invention by indicating with the finger makes it possible to define the coordinates of any point on a fixed or moving image projected onto the surface 1, and to repeat this operation at close intervals in time. The accuracy achieved is excellent and depends on the surface area of the contact object used, e.g. the finger. The apparatus is also most reliable since if some dirt were to fall on the surface, then the short-circuit it would cause would appear as coordinates in the absence of the object and thus reveal it immediately.

The invention further provides for the predetermining of the abscissa coordinates of contact zones by arranging the widened parts on the strips (FIG. 6), for the purposes of a conversational use upon display. By way of an example, widened sections 21 can be positioned on the emitter strips E for defining keys corresponding to alphanumeric values.

In another configuration, the emitter strip can be split into E' and E'' on either side of the receiver strip R' and comprise widened sections 22' and 22''.

Of course, the invention is not restricted to the examples described but covers numerous variants accessible to specialists in the field. The strips could take forms varied in terms of the application such as, for instance, a greater density there on the screen whose finer resolution is needed, or instead of being rectilinear have a sinusoidal or castellated form, or be circular and concentric for certain and radial for the others and thereby define a point in polar coordinates.

Likewise, the strips could consist of deposits other than tin oxide, for example, indium or cadmium oxide or other mixtures of various metal oxides, be doped with dopants other than fluorine, for example antimony and be deposited by vapour phase or cathode projection.

They could, moreover, be deposited with no difficulty in thicker layers that are more resistant to abrasion than in the afore-described example offering thus a very wide surface resistance range dropping for instance down to $10\Omega$ for a strip section equal in length to its width.

These strips could have different widths and spacing than those mentioned, possible only providing they can be easily connected electrically via the finger or any other conducting instrument such as, for example, the tip of a conducting rubber rod or a stylus with flexible metal conducting strands having dimensions suitably matched with the width and spacing of the emitter and receiver strips.

Furthermore, for the purpose of easing the keyboard-to-electronic circuitry connections, all the receiver $R_1$ to $R_4$ and emitter $E_1$ to $E_5$ strip connections could be routed to one and the same side of the screen.

Additionally, the strips 3 and 4 could be done away with, in which case the necessary connections would be ensured by a strip of rubber, of the Zebra type for example, composed in a known fashion with alternate conducting and resistant bands whose pitch would be chosen to match the connection with the network of emitter ($E_1$ to $E_5$) and receiver ($R_1$ to $R_4$) strips on the one hand and on the other hand with a flexible printed circuit linking through to the detection system. This rubber element would be secured in a suitable manner between the screen plate and the flexible printed circuit.

Moreover, the strip support can be composed, as described in the example, directly by the front face of a cathode ray tube and also the front face of any other type of display tube such as plasma, LED or liquid crystal display systems; the support can also constitute a screen that is placed in front of another screen like those mentioned above or in front of a map (street, or town map etc.).

In the latter cases, this support can be made of glass but also any other insulating transparent mineral or organic substance, a hard plastic such as Perspex or soft plastic such as sheet polycarbonate providing the surfaces are treated in such a way that conducting strips having the same transparency, hard-wearing and electrical resistance characteristics can be laid in place.

We claim:

1. A method for determining coordinates of a conducting object on a surface, said conducting object establishing an electrical bridge on said surface between one emitter strip and one receiver strip of a pattern comprising parallel emitter strips lying on said surface and simultaneously connected to a voltage generator, and parallel receiver strips lying on said surface alternately with said emitter strips, said method comprising the steps of:

(a) cyclically exploring said receiver strips one after the other and detecting the receiver strip which has a voltage different from the other receiver strips, said detected receiver strip being representative of one coordinate (Y) of said conducting object, (b) measuring the voltage of said detected receiver strip and comparing said measured voltage with the voltage of said voltage source, said measured voltage being representative of another coordinate (X) of said point on said surface.

2. A method as claimed in claim 1 wherein several measures of the voltage of said detected receiver strip are made with an alternated polarity of said voltage source, and an average value of said measures is calculated.

3. A method as claimed in claim 2 wherein said voltage source is an alternating voltage source having a frequency of about 1 Khz.

4. A method as claimed in claim 1 wherein the exploration is resumed once said detected receiver strip has a voltage below a predetermined threshold.

5. A device for determining coordinates (X,Y) of a conducting object on a surface comprising:

(a) parallel emitter strips lying on said surface and each having one end connected to a terminal of a common voltage generator and another end connected to a ground terminal, (b) parallel receiver strips lying on said surface alternately with said emitter strips, and (c) an exploring stage for cyclically connecting one end of each of said receiver strips to a voltage measuring apparatus.

6. A device as claimed in claim 5 wherein said voltage generator is an alternating voltage generator.

7. A device as claimed in claim 6 wherein a filtering stage and a rectifying stage are serially mounted between said exploring stage and said voltage measuring apparatus.

8. A device as claimed in claim 5 including an inverting stage having one input terminal connected to said voltage generator and two inverted outputs respectively connected to one end of each of said emitter strips.

* * * * *